(12) United States Patent
Kim et al.

(10) Patent No.: US 11,747,846 B2
(45) Date of Patent: Sep. 5, 2023

(54) DIGITAL LDO REGULATOR FOR PERFORMING ASYNCHRONOUS BINARY SEARCH USING BINARY-WEIGHTED PMOS ARRAY AND OPERATION METHOD THEREOF

(71) Applicant: Korea University Research and Business Foundation, Seoul (KR)

(72) Inventors: Chul Woo Kim, Seoul (KR); Jun Young Maeng, Seoul (KR); In Ho Park, Seoul (KR); Jin Woo Jeon, Seoul (KR); Hyun Jin Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 119 days.

(21) Appl. No.: 17/465,029

(22) Filed: Sep. 2, 2021

(65) Prior Publication Data

US 2022/0308611 A1 Sep. 29, 2022

(30) Foreign Application Priority Data

Mar. 29, 2021 (KR) .......................... 10-2021-0040626

(51) Int. Cl.
*G05F 1/56* (2006.01)
*G05F 1/563* (2006.01)
*G05F 1/46* (2006.01)

(52) U.S. Cl.
CPC .............. *G05F 1/563* (2013.01); *G05F 1/468* (2013.01)

(58) Field of Classification Search
CPC .................................. G05F 1/468; G05F 1/563
See application file for complete search history.

(56) References Cited

U.S. PATENT DOCUMENTS

| | | | |
|---|---|---|---|
| 9,735,679 B2 | 8/2017 | Holzmann | |
| 9,946,281 B1* | 4/2018 | Huang | ..................... G05F 1/565 |
| 11,444,532 B2* | 9/2022 | Liu | ......................... G05F 1/571 |
| 11,538,387 B1* | 12/2022 | Lee | ........................... G09G 3/20 |
| 2016/0282889 A1 | 9/2016 | Mahajan et al. | |
| 2017/0212540 A1* | 7/2017 | Cho | ..................... H03K 5/1534 |

(Continued)

FOREIGN PATENT DOCUMENTS

| | | |
|---|---|---|
| KR | 10-1617101 B1 | 4/2016 |
| KR | 10-2017-0089742 A | 8/2017 |
| KR | 10-2020-0054008 A | 5/2020 |

OTHER PUBLICATIONS

Huang et al., "A Fully-Integrated Digital LDO with Coarse-Fine-Tuning and Burst-Mode Operation", Jul. 2016, IEEE Transactions on Circuits and Systems-II: Express Briefs, vol. 63, p. 683-687 (Year: 2016).*

(Continued)

*Primary Examiner* — Jue Zhang
*Assistant Examiner* — Lakaisha Jackson
(74) *Attorney, Agent, or Firm* — NSIP Law (57) ABSTRACT

Disclosed is a digital LDO regulator capable of performing asynchronous binary search using a binary-weighted PMOS array. The digital LDO regulator includes a PMOS array unit including a binary-weighted PMOS array and that binary searches the PMOS array asynchronously, and a mode determining unit that operates in at least one of a fine mode, a coarse mode, and a medium mode, based on an output voltage of the PMOS array unit.

11 Claims, 7 Drawing Sheets

(56) References Cited

U.S. PATENT DOCUMENTS

2018/0226981 A1* 8/2018 Salem ................. H03M 1/0617
2021/0203228 A1* 7/2021 Liu ........................... G05F 1/59
2022/0200784 A1* 6/2022 Kumar ................. H04L 9/0631

OTHER PUBLICATIONS

Okuma, Yasuyuki, et al., "0.5-V Input Digital Low-Dropout Regulator (LDO) with 98.7% Current Efficiency in 65 nm CMOS," *IEICE transactions on electronics,* 94, 6, 2011 (pp. 938-944).
Woo, Ki-Chan, et al., "Fast-Transient Digital LDO Regulator With Binary-Weighted Current Control," *Journal of the Korea Institute of Information and Communication Engineering,* 20, 6, 2016 (pp. 1154-1162).

* cited by examiner

DIGITAL LDO REGULATOR FOR PERFORMING ASYNCHRONOUS BINARY SEARCH USING BINARY-WEIGHTED PMOS ARRAY AND OPERATION METHOD THEREOF

CROSS-REFERENCE TO RELATED APPLICATIONS

This application claims priority under 35 U.S.C. § 119 of Korean Patent Application No. 10-2021-0040626, filed on Mar. 29, 2021, in the Korean Intellectual Property Office, the disclosures of which are incorporated by reference herein in their entireties.

BACKGROUND

Embodiments of the present disclosure relate to a digital LDO regulator, and more particularly, relate to a digital LDO regulator that performs asynchronous binary search using a binary-weighted PMOS array.

An LDO regulator (low drop-out regulator) is a kind of linear regulator. The LDO regulator is used to stably supply power to various types of electronic devices. For example, the LDO regulator may be used in a power management integrated circuit (PMIC) of a mobile device such as a smart phone or a tablet PC.

However, as the integrated circuit gradually pursues high integration and high performance, the transient response performance of the LDO regulator required by the industry is increasing. In this case, when only time complexity is considered, it is difficult to implement fast transient response performance in a wide output current range using only a conventional digital-based search algorithm.

SUMMARY

Embodiments of the present disclosure provide a digital LDO regulator that makes an output voltage of a regulator close to a reference voltage in a shorter time.

According to an embodiment of the present disclosure, a digital LDO regulator includes a PMOS array unit including a PMOS array which is weighted in binary, and that asynchronously binary searches the PMOS array, and a mode determining unit that operates in at least one of a fine mode, a coarse mode, and a medium mode, based on an output voltage of the PMOS array unit.

In an embodiment, the mode determining unit may include a first operation unit that performs the fine mode, and a second operation unit that performs at least one of the coarse mode and the medium mode.

In an embodiment, the LDO regulator may further include first to third comparators that provide up-down signals to the mode determining unit, and the first comparator may output a first up-down signal to the first operation unit based on a first clock signal, the second comparator may output a second up signal to the second operation unit regardless of a clock signal, and the third comparator may output a second down signal to the second operation unit regardless of the clock signal.

In an embodiment, the mode determining unit may be preset to the fine mode, and the fine mode may be a mode in which the first comparator connected to a first reference voltage is operated for each clock of the first clock signal.

In an embodiment, the fine mode may be a mode in which the output voltage of the PMOS array unit is made close to the first reference voltage.

In an embodiment, the mode determining unit may perform the coarse mode when it is determined that the output voltage of the PMOS array unit is greater than a second reference high voltage by the second comparator or less than a second reference low voltage by the third comparator.

In an embodiment, the coarse mode may be a mode that identifies a change in at least one of the second reference high voltage and the second reference low voltage while a second clock signal is input.

In an embodiment, when it is determined that the output of the PMOS array unit is stably set as there is no change in the at least one of the second reference high voltage and the second reference low voltage, an operation performance may be changed from the coarse mode to the medium mode.

In an embodiment, the medium mode may be a mode in which a PMOS code is determined by identifying whether the output voltage of the PMOS array unit is between which voltages by operating the first comparator.

According to an embodiment of the present disclosure, a method of operating a digital LDO regulator including a binary-weighted PMOS array includes performing an asynchronous binary search with respect to the binary-weighted PMOS array, and controlling an operation in at least one of a fine mode, a coarse mode, and a medium mode, based on an output voltage of the binary-weighted PMOS array.

In an embodiment, the controlling of the operation in the at least one of the fine mode, the coarse mode, and the medium mode may include allowing a first comparator connected to a first reference voltage to be operated based on a first clock signal, identifying a voltage change of at least one of a second reference high voltage and a second reference low voltage while a second clock signal is input, identifying whether the output voltage of the PMOS array is between which voltages by operating the first comparator, and determining a PMOS code based on the identified voltage.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, the present disclosure will be described with reference to accompanying drawings. As the present disclosure is capable of various changes and may have various embodiments, specific embodiments are illustrated in the drawings and the related detailed description is set forth. However, this is not intended to limit the present disclosure to specific embodiments, and should be understood to include all modifications and/or equivalents or substitutes included in the spirit and scope of the present disclosure. With regard to description of drawings, similar components may be marked by similar reference numerals.

Expressions such as "comprises" or "may include" that may be used in the present disclosure indicate the existence of the disclosed function, operation, or component, and do not limit one or more additional functions, operations, or components. In addition, in the present disclosure, terms such as "comprise" or "have" are intended to designate that a feature, number, step, operation, component, part, or combination thereof described in the specification exists, but it should be understood that it does not preclude the possibility of addition or existence of one or more other features or numbers, steps, operations, components, parts, or combinations thereof.

In this disclosure, expressions such as "or" include any and all combinations of the words listed together. For example, "A or B" may include A, may include B, or may include both A and B.

In the present disclosure, expressions such as "first," "second," "the first," or "the second," may indicate various components of the disclosure, but do not limit the components. For example, the above expressions do not limit the order and/or importance of corresponding components. The above expressions may be used to distinguish one component from another. For example, both the first user device and the second user device are user devices, and represent different user devices. For example, without departing from the scope of the present disclosure, a first component may be referred to as a second component, and similarly, a second component may also be named as a first component.

When a component is referred to as being "connected" or "coupled" to another component, it may be directly connected to or coupled to that other component, but it should be understood that other components may be present in therebetween. On the other hand, when a component is said to be "directly connected" or "directly coupled" to another component, it should be understood that there is no other component in therebetween.

The terms used herein is for the purpose of describing particular example embodiments only and is not intended to be limiting of the present disclosure. Singular expressions include plural expressions unless the context clearly indicates otherwise Unless defined otherwise, all terms used herein, including technical or scientific terms, have the same meaning as commonly understood by one of ordinary skill in the art to which this application belongs. Terms such as those defined in commonly used dictionaries should be interpreted as having meanings consistent with the meanings in the context of the related art, unless expressly defined herein, they are not to be interpreted in an ideal or overly formal sense.

Figure 1:
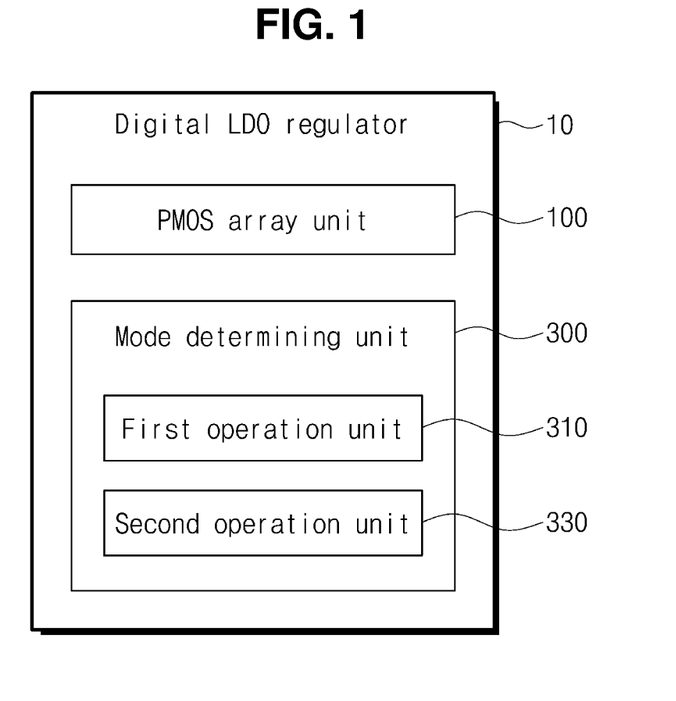
FIG. 1 is a block diagram illustrating a digital LDO regulator according to an embodiment of the present disclosure.

FIG. 1 is a block diagram illustrating a digital LDO regulator according to an embodiment of the present disclosure.

Referring to FIG. 1, a digital LDO regulator 10 may include a PMOS array unit 100, a mode determining unit 300, and a plurality of comparators.

The PMOS array unit 100 may include a plurality of binary-weighted PMOS arrays, and may perform an asynchronous binary search with respect to the PMOS array. A power transistor of the PMOS array unit 100 may be designed as a 12-bit PMOS array.

The PMOS array unit 100 may be individually operated depending on an output voltage, and only some may be operated, or the entirety may be turned off. For example, when the output voltage of the PMOS array unit 100 is less than a preset voltage, the largest PMOS array and the second largest PMOS array may be turned on to charge the output voltage. In contrast, when the output voltage of the PMOS array unit 100 is greater than the preset voltage, the plurality of PMOS arrays may be turned off to discharge the output voltage.

A fine mode bit output signal may be normally input to the PMOS array unit 100, and a coarse mode bit output signal and a medium mode bit output signal may be input to the PMOS array unit 100 depending on an output voltage. For example, when the output voltage of the PMOS array unit 100 is less or greater than the preset voltage, the PMOS array unit 100 may receive the coarse mode bit output signal and the medium mode bit output signal. Details related thereto will be described later with reference to FIG. 2.

The mode determining unit 300 may operate in at least one of a fine mode, a coarse mode, and a medium mode, based on the output voltage of the PMOS array unit 100.

The mode determining unit 300 may include a first operation unit 310 that performs the fine mode and a second operation unit 330 that performs at least one of the coarse mode and the medium mode.

The first operation unit 310 is an operation unit that operates in the fine mode and operates a first comparator 510 connected to a first reference voltage for each first clock signal to make $V_{OUT}$ close to the first reference voltage.

When it is determined that $V_{OUT}$ is greater than a second reference high voltage by a second comparator 530 in the first operation unit 310, or $V_{OUT}$ is less than a second reference low voltage by a third comparator 550 in the first operation unit 310, the second operation unit 330 may perform an operation in the coarse mode. In addition, when $V_{OUT}$ exists for a sufficiently long time between the second reference high voltage and the second reference low voltage, the operation in the coarse mode may be stopped, and the operation in the medium mode may be performed by switching to the medium mode.

Specific details related thereto will be described later with reference to FIG. 2.

Additionally, the digital LDO regulator 10 may further include the first to third comparators 510, 530, and 550 that provide up-down signals to the mode determining unit 300.

The first comparator 510 may output a first up-down signal to the first operation unit 310 based on the first clock signal. In this case, the first comparator 510 may be a dynamic comparator that performs a comparison operation based on a clock signal.

The second comparator 530 may output a second up signal regardless of the clock signal. The third comparator 550 may output a second down signal regardless of the clock signal. That is, the second and third comparators 530 and 550 may be static comparators that output only one predetermined signal.

Figure 2:
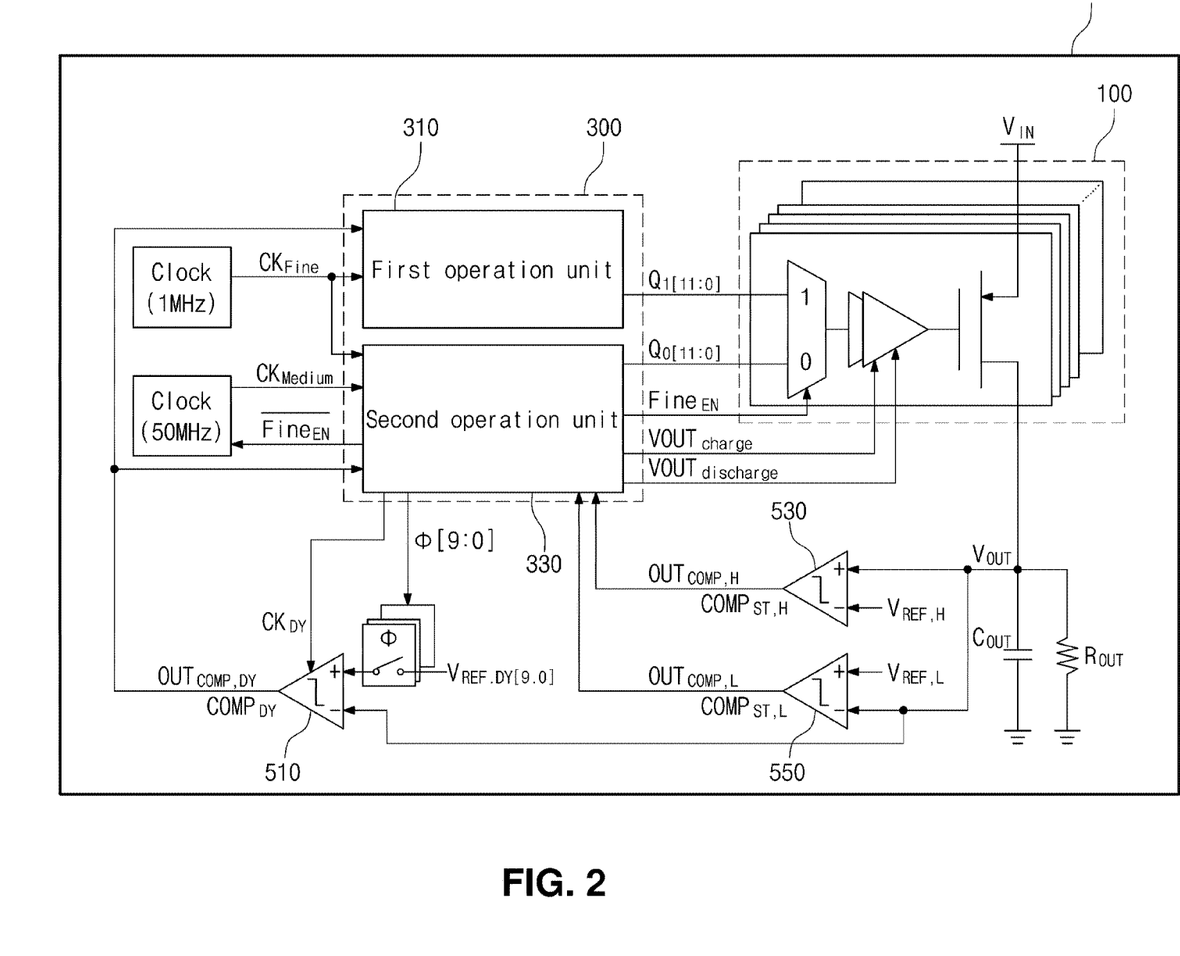
FIG. 2 is a circuit diagram illustrating a digital LDO regulator according to an embodiment of the present disclosure.

FIG. 2 is a circuit diagram illustrating the digital LDO regulator 10 according to an embodiment of the present disclosure.

Referring to FIG. 2, the PMOS array unit 100 receives one of the outputs of the first operation unit 310 and the second operation unit 330 depending on $FINE_{EN}$. For example, $FINE_{EN}$ is preset to '1' and causes an output of the first operation unit 310 to be input to the PMOS array unit 100.

In contrast, when the second operation unit 330 operates, $FINE_{EN}$ is turned off to '0' and causes an output of the second operation unit 330 to be input to the PMOS array unit 100.

The first operation unit 310 is an operation unit operating in the fine mode, and may operate the first comparator 510 ($COMP_{DY}$) connected to a first reference voltage $V_{REF,DY}$ for each first clock signal to make $V_{OUT}$ close to the first reference voltage. In this case, when it is determined that $V_{OUT}$ is greater than a second reference high voltage $V_{REF,H}$ by the second comparator 530 ($COMP_{ST,H}$) or is less than the second reference low voltage $V_{REF,L}$ by the third comparator 550 ($COMP_{ST,L}$), an operation of the second operation unit 330 may be started. In this case, the first clock signal may be 1 MHz.

The second operation unit 330 may operate in at least one of the coarse mode and the medium mode. When it is determined in the first operation unit 310 that $V_{OUT}$ is greater than the second reference high voltage by the second comparator 530 or $V_{OUT}$ is less than the second reference low voltage by the third comparator 550, the second operation unit 330 may perform the operation in the coarse mode.

When a signal of the second comparator 530 or the third comparator 550 does not change while a second clock signal is input several times, it is determined that $V_{OUT}$ is stable and the coarse mode may be terminated. In this case, since an $I_{OUT}$ range is determined by the number of each PMOS during operation in the coarse mode, whether the signal of the second comparator 530 or the third comparator 550 changes may be determined for several second clock signals by calculating the longest RC delay to charge or discharge $C_{OUT}$. In this case, the second clock signal may be 50 MHz.

For example, when $V_{OUT}$ does not pass between the second reference high voltage and the second reference low voltage during a cycle of the second clock signal preset for each number of turned-on PMOSs, an operation in the medium mode may be started. In this case, since the time it takes for $V_{OUT}$ to move increases as the number of PMOSs decreases, the cycle of the second clock signal may be inversely proportional to the number of PMOSs.

In detail, in the coarse mode, when $V_{OUT}$ exists for a sufficiently long time between the second reference high voltage and the second reference low voltage, the operation in the coarse mode is stopped, and the operation of the medium mode may be performed by switching to the medium mode.

The medium mode is a mode in which the first comparator 510 may be operated while continuously changing a + terminal of the first reference voltage using the second clock signal. Therefore, it is possible to determine a final 12-bit PMOS code by identifying whether $V_{OUT}$ is between which voltages of voltages of the first reference voltage. For example, the final 12-bit PMOS code may be determined by identifying whether $V_{OUT}$ is between which voltages of the ten first reference voltages$_{[9:0]}$.

By using a Preset signal$_{Q1[11:0]}$, the first operation unit 310 may be set to the determined PMOS code, and the operation of the medium may be completed.

Thereafter, by setting $FINE_{EN}$ to '1', the PMOS array may be controlled by the first operation unit 310.

For example, the first operation unit 310 may make $V_{OUT}$ as close to $V_{REF,DY4}$ as possible by operating the first comparator 510 connected to $V_{REF,DY4}$ for each first clock signal. In this case, when it is determined again that $V_{OUT}$ is greater than the second reference high voltage by the second comparator 530 or less than the second reference low voltage by the third comparator 550, the operation of the second operation unit 330 may be started.

As described above, the digital LDO regulator 10 of the present disclosure may include a binary-weighted PMOS array, may perform asynchronous binary search with respect to the PMOS array, and may perform an operation in at least one of the fine mode, the coarse mode, and the medium mode, based on the output voltage of the PMOS array unit 100.

The digital LDO regulator 10 of the present disclosure having the above-described structure may quickly make the output voltage of the regulator close to the reference voltage.

Figure 3:
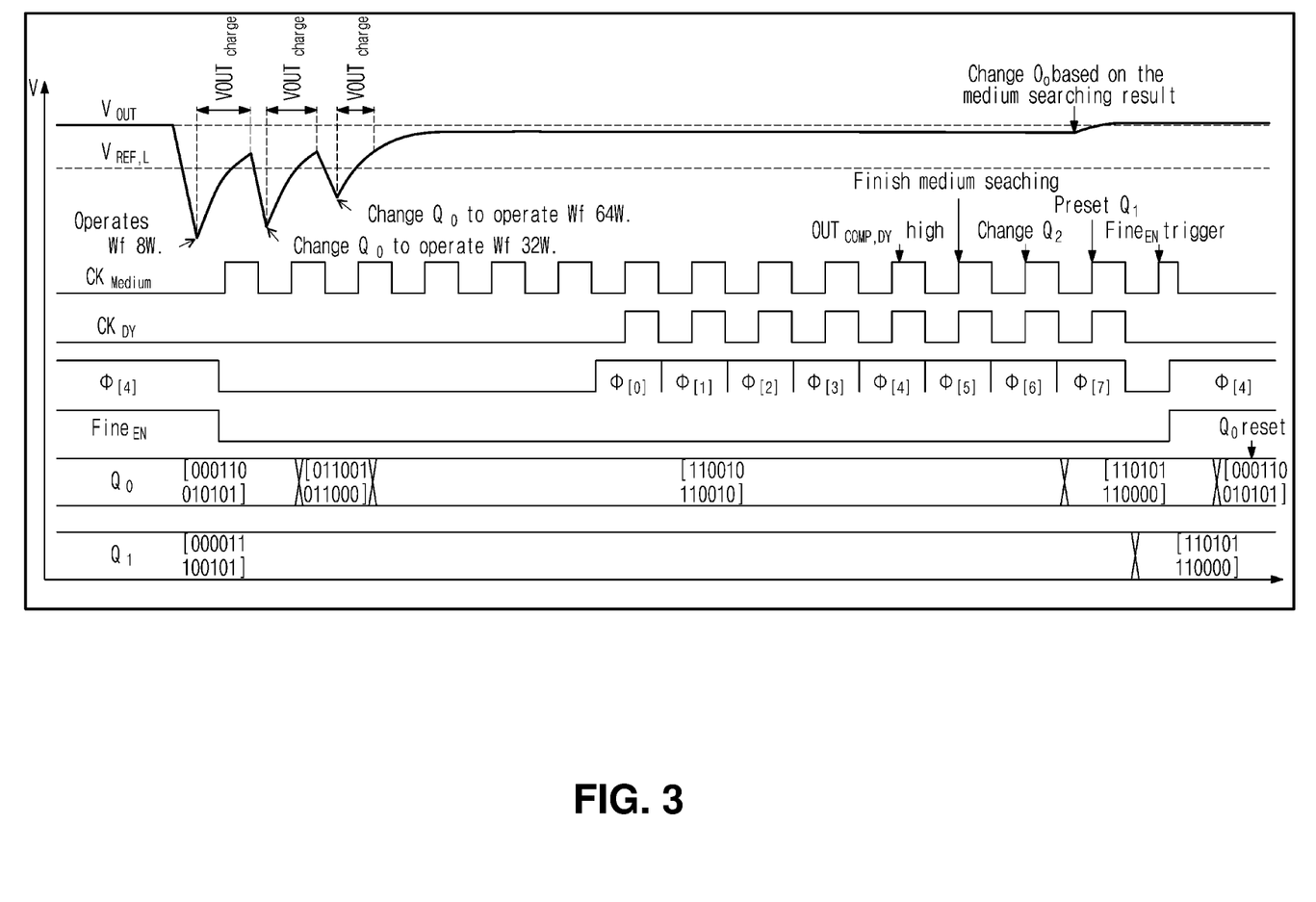
FIG. 3 is a diagram illustrating an example of a digital LDO regulator according to an embodiment of the present disclosure.

FIG. 3 is a diagram illustrating an example of a digital LDO regulator according to an embodiment of the present disclosure.

Referring to FIG. 3, a simulation is shown when an output power of a digital LDO regulator is rapidly increased and the voltage of VOGT is rapidly dropped.

In detail, when $V_{OUT}$ is less than the second reference low voltage, the output signal of the third comparator 550 changes from '0' to '1' to determine a drop in VOGT, and the operation of the second operation unit may be started. In this case, since $V_{OUT}$ should be greater than the second reference low voltage for accurate searching in the second operation unit, a signal $V_{OUT,CHARGE}$ that turns on the largest PMOS and the second largest PMOS and turns off the remaining PMOSs may be operated until the output signal of the third comparator becomes '0' again.

Since $FINE_{EN}$ becomes '0' after increasing $V_{OUT}$, $Q_0$, which is an output signal of the second operation unit, may control the PMOS array unit.

The second operation unit determines the output code through several searches.

The first search is to apply 8Wx, which is 8 times the smallest PMOS width (Wx; width), to the PMOS array unit. In this case, the search code may be [001_1001_0101].

In this case, since $V_{OUT}$ is less than the second reference low voltage again, the second search may be started with [0110_0101_1000], which is a code of 32Wx, after raising $V_{OUT}$ above the second reference low voltage again by using the signal $V_{OUT,CHARGE}$.

However, since $V_{OUT}$ is less than the second reference low voltage again, after raising $V_{OUT}$ above the second reference low voltage again by using the signal $V_{OUT,CHARGE}$, the coarse mode may be terminated while applying [1100_1011_0010], which is a code of 64Wx, to the output of the second operation unit.

Thereafter, the operation in the medium mode is performed by counting the number of times the second clock becomes high. For example, in the medium mode, by operating the first comparator every about 20 ns, it may be determined that $V_{OUT}$ exists between which first reference voltages$_{[9:0]}$. When the output signal $OUT_{COMP,RY}$ of the first comparator becomes high, the operation in the medium mode may be terminated while applying the found final code (e.g., 1101_0111_0000) to the first operation unit.

When the operation in the second operation unit is determined, the output of the second operation unit may be reset to [0001_1001_0101], which is the first search code, again to wait for a subsequent operation.

Figure 4:
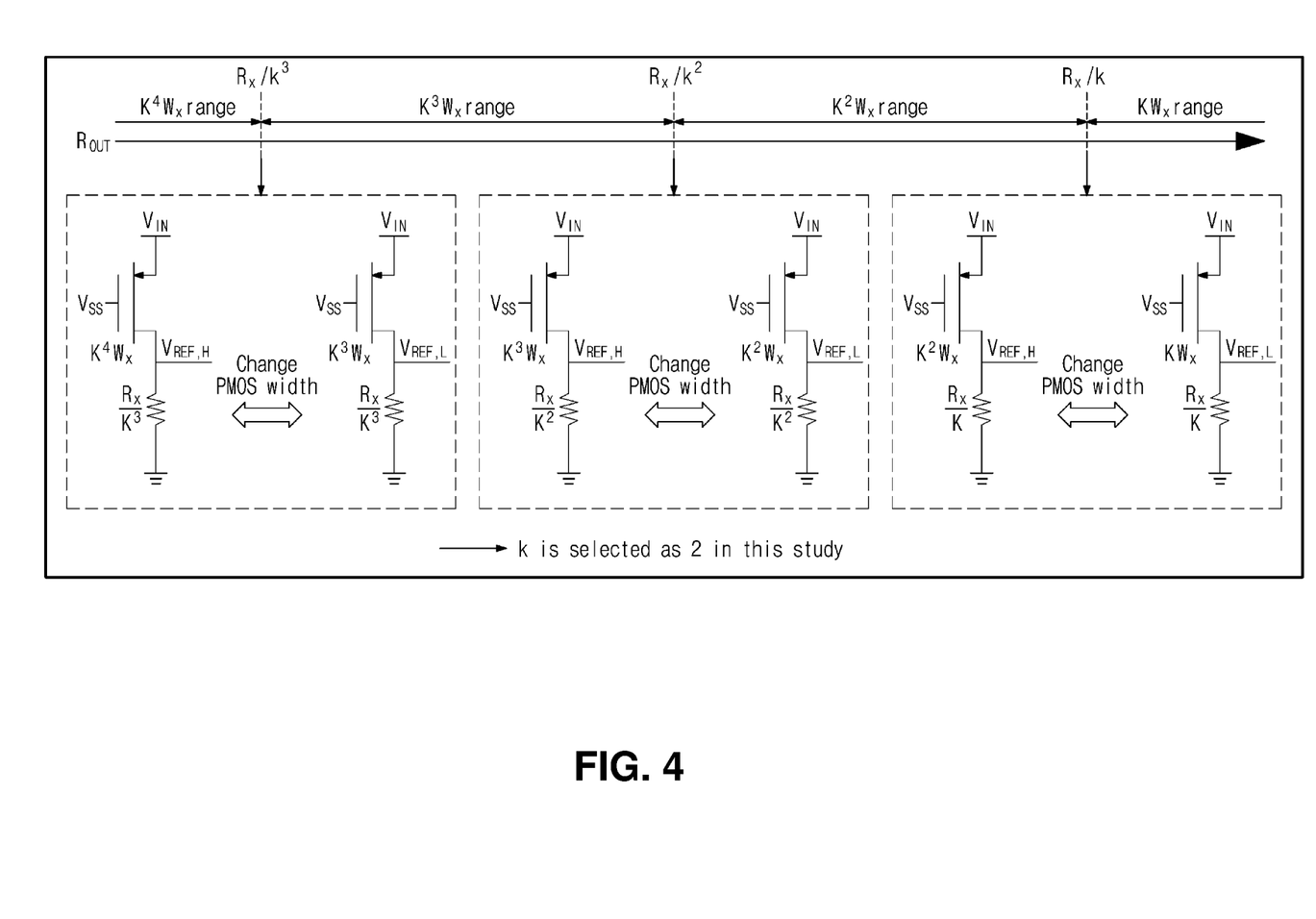
FIG. 4 is a diagram illustrating an operation in a coarse mode according to an embodiment of the present disclosure.

FIG. 4 is a diagram illustrating an operation in the coarse mode according to an embodiment of the present disclosure.

Referring to FIG. 4, it may be seen that an operation in the coarse mode is performed when a value of 'k' is set to '2' for convenience of description and the second reference low voltage and the second reference high voltage are arbitrarily determined and designed.

For example, when a load resistor of $Rx/k^3$ is connected to $V_{OUT}$, and $V_{OUT}$ voltage of the digital LDO regulator with a PMOS of $k^4Wx$ turned on is the second reference high voltage, and when the $V_{OUT}$ voltage of the digital LDO regulator with a PMOS of $k^3Wx$, which is smaller than the PMOS of $k^4Wx$, is set as the second reference low voltage in such the load resistance state, the coarse mode may operate.

As another example, when a load resistance of $Rx/k^2$ is connected to $V_{OUT}$, and $V_{OUT}$ voltage of the digital LDO regulator with a PMOS of $k^3Wx$ turned on is the second reference high voltage, and when the $V_{OUT}$ voltage of the digital LDO regulator with a PMOS of $k^2Wx$, which is smaller than the PMOS of $k^3Wx$, is set as the second reference low voltage in such the load resistance state, the coarse mode may operate.

Figure 5:
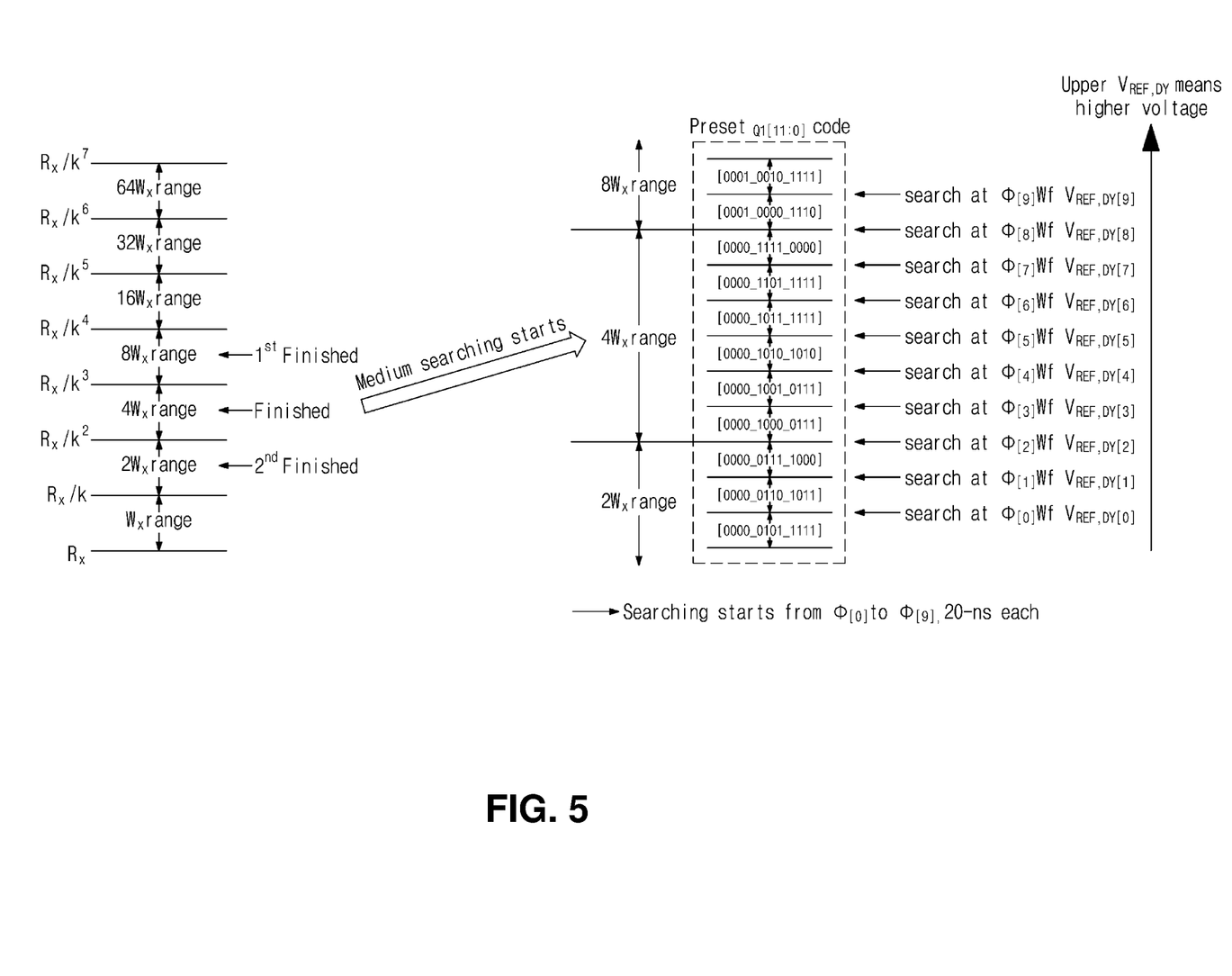
FIG. 5 is a diagram illustrating an operation in a medium mode according to an embodiment of the present disclosure.

FIG. 5 is a diagram illustrating an operation in a medium mode according to an embodiment of the present disclosure.

Referring to FIG. 5, in the medium mode, it may be found that $V_{OUT}$ falls within which range. In the medium mode, it may be found that $V_{OUT}$ falls within which range by inputting a code value corresponding to a result range of the coarse mode to the PMOS array unit. In this case, the code determined in the medium mode may determine $Preset_{Q1[11:0]}$ to start the first operation unit.

For example, as illustrated in FIG. 5, 8Wx was initially attempted but failed in the coarse mode, and 2Wx was attempted secondly, but failed, and finally 4Wx may be determined. Thereafter, in the medium mode, a code value of 4Wx, which is a result value in the coarse mode, may be input to the PMOS array unit. In the medium mode, it is possible to search sequentially from the smallest code value among the code values corresponding to 4Wx to the largest code value corresponding to 4Wx. In this case, the determined code value may be determined as $Preset_{Q1[11:0]}$.

Figure 6:
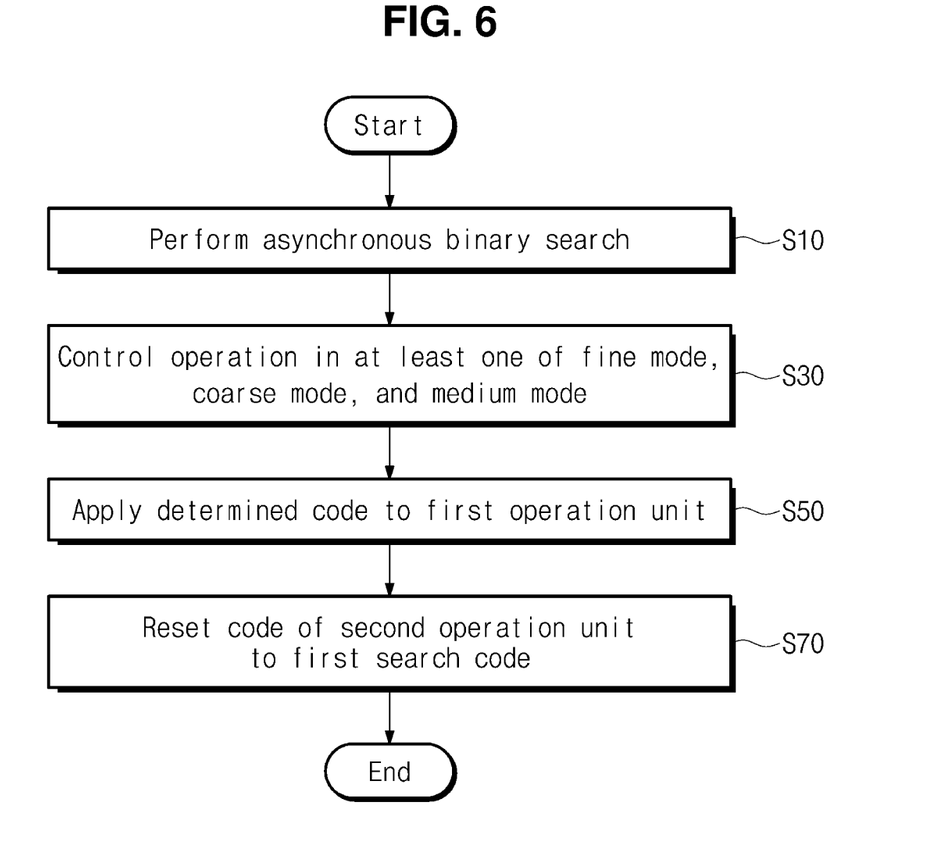
FIG. 6 is a flowchart illustrating an operation method of a digital LDO regulator according to an embodiment of the present disclosure.

FIG. 6 is a flowchart illustrating an operation method of a digital LDO regulator according to an embodiment of the present disclosure.

Referring to FIG. 6, in operation S10, an asynchronous binary search may be performed. For example, the asynchronous binary search may be performed with respect to a plurality of binary-weighted PMOS arrays.

Operation S30 may operate in at least one of the fine mode, the coarse mode, and the medium mode. In this case, it may be divided into the first operation unit that performs a fine mode and the second operation unit that performs at least one of the coarse mode and the medium mode. For example, the first operation unit is an operation unit operating in a fine mode and may operate a first comparator connected to the first reference voltage for each first clock signal to make $V_{OUT}$ close to the first reference voltage.

In the first operation unit, when it is determined that $V_{OUT}$ is greater than the second reference high voltage by the second comparator or is less than the second reference low voltage by the third comparator, the second operation unit may be operated in the coarse mode. In addition, when $V_{OUT}$ exists for a sufficiently long time between the second reference high voltage and the second reference low voltage, the operation in the coarse mode may be stopped, and the operation in the medium mode may be performed by switching to the medium mode.

In operation S50, the determined code may be applied to the first operation unit. For example, the PMOS array unit may be searched by applying the final code obtained through the operation in the medium mode to the first operation unit.

In operation S70, the code of the second operation unit may be reset to the first search code. For example, when the operation of the second operation unit is terminated, the second operation unit may be reset to [0001_1001_0101], which is the first search code, again to wait for a subsequent operation.

Figure 7:
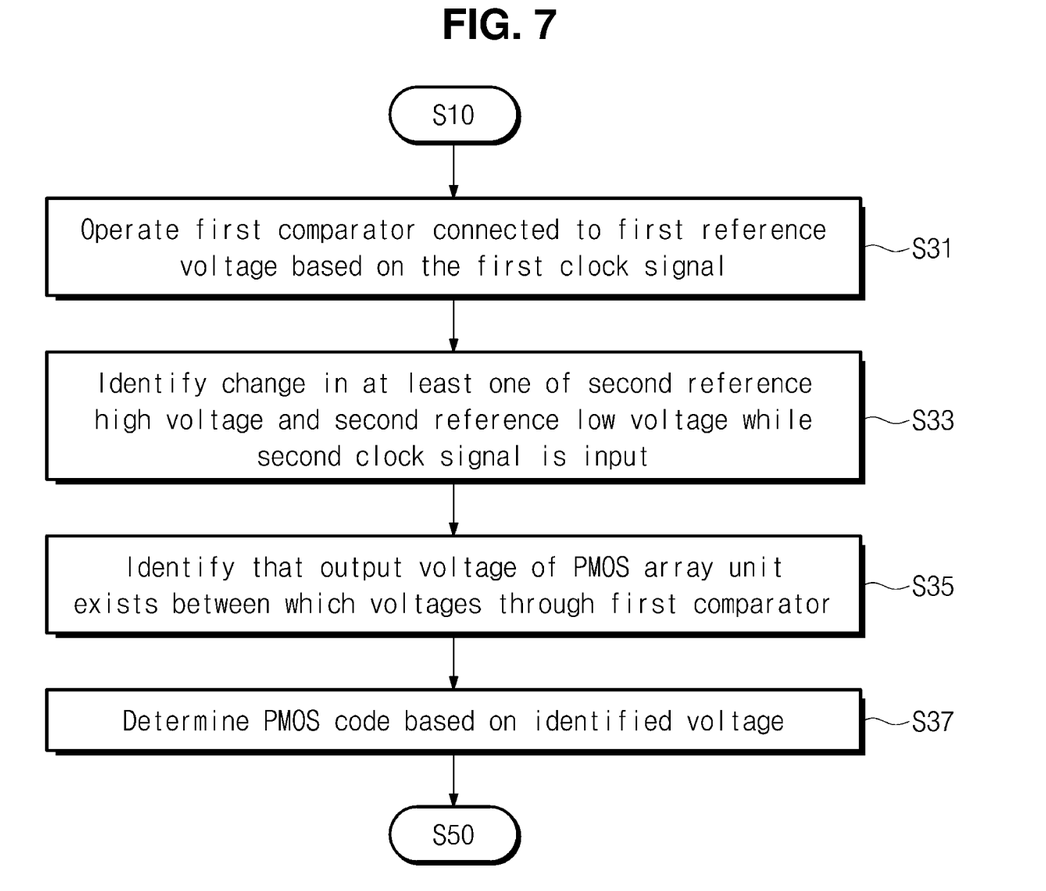
FIG. 7 is a flowchart illustrating an operation method of a mode determining unit according to an embodiment of the present disclosure.

FIG. 7 is a flowchart illustrating an operation method of a mode determining unit according to an embodiment of the present disclosure.

Referring to FIG. 7, in operation S31, the first comparator connected to the first reference voltage may be operated based on the first clock signal. For example, by operating the first comparator for each first clock signal, $V_{OUT}$ may be made close to the first reference voltage.

In operation S33, a change in at least one of the second reference high voltage and the second reference low voltage may be identified while the second clock signal is input. For example, when $V_{OUT}$ exists for a sufficiently long time between the second reference high voltage and the second reference low voltage, the operation in the coarse mode may be stopped, and the operation in the medium mode may be performed by switching to the medium mode.

In operation S35, it may be identified that the output voltage of the PMOS array unit exists between which voltages through the first comparator. For example, it may be identified whether $V_{OUT}$ exists between which voltages of the ten first reference voltages$_{[9:0]}$.

In operation S37, a PMOS code may be determined based on the identified voltage. For example, the final 12-bit PMOS code may be determined based on the identified voltage range.

According to embodiments of the present disclosure, a digital LDO regulator may quickly bring a regulator's output voltage close to a reference voltage.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A digital LDO regulator comprising:
a PMOS array unit comprising a PMOS array, which is weighted in binary, and configured to asynchronously binary search the PMOS array; and
a mode determining unit configured to operate in at least one of a fine mode, a coarse mode, and a medium mode, based on an output voltage of the PMOS array unit,
wherein the mode determining unit comprises a first operation unit configured to perform the fine mode,
wherein the digital LDO regulator further comprises first to third comparators configured to provide up-down signals to the mode determining unit, and
wherein the first comparator outputs a first up-down signal to the first operation unit based on a first clock signal.

2. The digital LDO regulator of claim 1, wherein the mode determining unit further comprises
a second operation unit configured to perform at least one of the coarse mode and the medium mode.

3. The digital LDO regulator of claim 2,
wherein the second comparator outputs a second up signal to the second operation unit regardless of the first clock signal, and
wherein the third comparator outputs a second down signal to the second operation unit regardless of the clock signal.

4. The digital LDO regulator of claim 1, wherein the mode determining unit is preset to the fine mode, and wherein the fine mode is a mode, in which the first comparator connected to a first reference voltage is operated for each clock of the first clock signal.

5. The digital LDO regulator of claim 4, wherein the fine mode is a mode, in which the output voltage of the PMOS array unit is made close to the first reference voltage.

6. The digital LDO regulator of claim 1, wherein the mode determining unit performs the coarse mode when it is determined that the output voltage of the PMOS array unit is greater than a second reference high voltage by the second comparator or less than a second reference low voltage by the third comparator.

7. The digital LDO regulator of claim 6, wherein the coarse mode is a mode that identifies a change in at least one of the second reference high voltage and the second reference low voltage while a second clock signal is input.

8. The digital LDO regulator of claim 6, wherein, when it is determined that the output of the PMOS array unit is stably set as there is no change in the at least one of the second reference high voltage and the second reference low voltage, an operation performance is changed from the coarse mode to the medium mode.

9. The digital LDO regulator of claim 1, wherein the medium mode is a mode, in which a PMOS code is determined by identifying whether the output voltage of the PMOS array unit is between which voltages by operating the first comparator.

10. A method of operating a digital LDO regulator including a binary-weighted PMOS array, the method comprising:
performing an asynchronous binary search with respect to the binary-weighted PMOS array; and
controlling an operation in at least one of a fine mode, a coarse mode, and a medium mode, based on an output voltage of the binary-weighted PMOS array,
wherein the controlling of the operation in the at least one of the fine mode, the coarse mode, and the medium mode comprises:
allowing a first comparator connected to a first reference voltage to be operated based on a first clock signal; and
identifying a voltage change of at least one of a second reference high voltage and a second reference low voltage while a second clock signal is input.

11. The method of claim 10, wherein the controlling of the operation in the at least one of the fine mode, the coarse mode, and the medium mode further comprises
identifying whether the output voltage of the PMOS array is between which voltages by operating the first comparator; and
determining a PMOS code based on the identified voltage.

* * * * *